United States Patent [19]
Watson et al.

[11] 3,718,736
[45] Feb. 27, 1973

[54] PROCESS FOR THE MANUFACTURE OF HYDROGEN FLUORIDE

[75] Inventors: William E. Watson, Mount Tabor; Richard P. Troeger, Chatham, both of N.J.

[73] Assignee: Allied Chemical Corporation, New York, N.Y.

[22] Filed: Sept. 20, 1971

[21] Appl. No.: 182,261

Related U.S. Application Data

[63] Continuation of Ser. No. 876,552, Nov. 13, 1969, abandoned.

[52] U.S. Cl. .................423/485, 423/155, 423/555
[51] Int. Cl. ..........................C01b 7/22, C01f 11/46
[58] Field of Search..............423/485, 555, 554, 155

[56] References Cited

UNITED STATES PATENTS

| | | | |
|---|---|---|---|
| 2,932,557 | 4/1960 | List et al. | 423/485 |
| 3,063,815 | 11/1962 | Redniss | 423/485 X |
| 3,207,579 | 9/1965 | Burkhardt | 423/485 |
| 3,278,265 | 10/1966 | Quarles | 423/485 |
| 3,300,279 | 1/1967 | Parisot | 423/485 |

*Primary Examiner*—Edward Stern
*Attorney*—Gerard P. Rooney

[57] ABSTRACT

Hydrogen fluoride is produced continuously by reacting calcium fluoride (fluorspar) and sulfuric acid, at temperatures between about 250° and 600°F. in the presence of more than 3 parts calcium sulfate per part of by-product calcium sulfate produced from said reaction.

4 Claims, No Drawings

PROCESS FOR THE MANUFACTURE OF HYDROGEN FLUORIDE

This is a continuation of application Ser. No. 876,552, filed Nov. 13, 1969, now abandoned.

This invention relates to a process for the production of hydrogen fluoride from calcium fluoride and sulfuric acid. By its application, high efficiencies and a relatively pure product can be obtained. This process is particularly adapted to large scale production where good thermal conductivity and a minimum of down time due to corrosion is essential.

In the past, the reaction has usually been carried out commercially in externally heated furnaces characterized by a metal shell provided with rails, scrapers, knockers, or other mechanical means to remove the by-product incrustations which would otherwise form on the furnace walls, thus limiting the rate of heat transfer through the furnace walls into the reaction mass.

Typically, commercial processes for preparing hydrofluoric acid employ furnaces which fall into four general types and may be described as follows:

a. One type of furnace comprises fixed horizontal metal cylinders, externally fired, and provided with rotating scrapers which serve to scrape the cylindrical walls and advance the reaction mass from the feed end to the discharge end of the furnace. In practice, this type furnace has limited utility because the corrosion of the scraper soon increases the clearance between scraper and furnace wall, so that a hard incrustation is invariably present which markedly reduces heat transfer. Furthermore, the resistance offered by the incrustation to the scraper causes very high torque on the scraper assembly, leading to high maintenance costs and down time.

b. Another type of furnace comprises rotating cylinders, externally heated, horizontal or nearly so, provided with loose rails or heavy bars inside, which by rotation of the furnace, scrape and tumble against the furnace walls to remove incrustation. The constant exposure of fresh metal surfaces on the rails and furnace wall accelerates corrosion so that furnaces of this type require frequent replacement of the rails and furnace shells after operating for about 2000 hours or less.

c. A third type of furnace includes the use of heavy duty premixers which premix the calcium fluoride and sulfuric acid, either or both of which are usually preheated to attain partial reaction in the mixer, to insure that the feed to the furnace will not incrust the furnace wall. This arrangement does protect the furnace and eliminates the need for scraping devices, but the most corrosive part of the reaction is thereby transferred to the costly premixer.

d. The fourth type of furnace is the one used to form a portion of the required sulfuric acid by reacting steam and sulfur trioxide within the furnace. Sulfuric acid in vapor phase ($SO_3$) will not react with fluorspar, but by showering the reaction mass through the sulfuric vapor, condensation and reaction are attained. While this system eliminates the problem of heat transfer through the furnace wall, it is relatively expensive to operate because of the cost of the sulfur trioxide, and the necessity for constructing the furnace shell of costly corrosion resistant alloys to resist the effect of the presence of sulfuric and hydrofluoric acid mixtures.

The above operations have certain drawbacks which seriously affect the economic feasibility of a commercial process - the first three have serious limitations when it is desired to design a high capacity furnace and the fourth is limited by high operating costs.

It is the object of this invention to provide a process for continuously manufacturing hydrogen fluoride from calcium fluoride and sulfuric acid, said process being applicable and practical for scale-up to high output levels and favorable to efficient production at low unit costs.

Another object of this invention is to provide a process in a furnace which may be operated without the use of rails, knockers, scrapers, or tumbling devices which lead to frequent shutdowns, maintenance, and parts replacement.

A further object of this invention is to provide a process which may be operated in a furnace constructed of relatively low cost materials without recourse in its design to costly corrosion resistant alloys.

A still further object of this invention is to provide a process by which relatively pure hydrogen fluoride may be commercially produced at high efficiencies.

These and other objects are accomplished according to the present invention wherein hydrogen fluoride is produced by the reaction of calcium fluoride and sulfuric acid at temperatures between about 250° and 600°F. in the presence of more than 3 parts calcium sulfate per part of by-product calcium sulfate produced. Preferably, the calcium sulfate is recycled by-product calcium sulfate withdrawn at a point in the furnace prior to the completion of the reaction in the production of hydrogen fluoride.

The essential feature of this invention involves the use of more than 3 parts of calcium sulfate per part of by-product calcium sulfate produced in the reaction mixture of fluorspar and sulfuric acid in the production of hydrofluoric acid and which is effectively achieved without any of the prior art difficulties. The effectiveness of this method of operation is surprising and unexpected since the furnace used may operate without any scrapers, knockers, or other means conventionally employed in removing incrustation from the shell. In operation, the mass within the furnace is substantially a free-flowing solid, and the walls are never exposed to the action of the highly corrosive liquid sulfuric acid. The HF produced is also of higher purity than that obtained from the types of furnaces previously discussed, because in those type furnaces the product gases contain large amounts of sulfur dioxide and elemental sulfur as a result of the reduction of sulfuric acid by nascent hydrogen released during the attack or corrosion of the metal of the furnace by the acid. Elemental sulfur is particularly objectionable as it tends to deposit on heat transfer surfaces and to plug acid drip collection lines.

In the prior art various methods have been proposed for obviating the problems in producing HF. One such method comprises mixing calcium fluoride and sulfuric acid by vigorous mechanical kneading prior to passage through the furnaces to assure high reaction efficiency. Such premixing may be necessary for high efficiency when a furnace is used which depends on a single passage. Any short period failure in contacting and mixing the fluorspar and acid in a single pass furnace is in fact irremedial and losses of expensive calcium fluoride and acid may result.

In contrast, the present process provides for the recycle of by-product calcium sulfate so that any short-term errors in the feed ratio of spar and acid average out and do not cause excessive losses. Also, the present process provides a degree of efficiency which is equal to or higher than that previously attainable only by the use of expensive premixers which are highly vulnerable to corrosive attack, yet the equipment employed in the present process may be of conventional construction in composition and design.

The present process operates with a recycle ratio of more than about 3:1 up to 10:1 or more, preferably a recycle ratio of about 3.5:1 up to about 8:1 with the upper limit being dictated by size of equipment rather than operating efficiencies. Sound commercial practice dictates the use of high recycle ratios to give better stability to the system, and allow for other liquids such as purification system acid drips, to be returned to the reaction zone. Also, when recycle ratios of higher values are used, the excess above the minimum serves to enfold and coat the wetted portions, thereby enhancing handling characteristics.

The use of calcium sulfate as an additive to the calcium fluoride-sulfuric acid reaction mixture in the production of hydrogen fluoride is known in the art. However, the amount of calcium sulfate employed in these processes is less than that of this invention. It has been found that the effectiveness in the use of a minimum ratio of calcium sulfate of more than about 3.5:1 is substantially greater than the systems of the prior art and is based on what is believed to be the actual reaction mechanism between sulfuric acid and calcium fluoride which is written overall by the simple reaction:

1. $CaF_2 + H_2SO_4 \longrightarrow CaSO_4 + 2HF$

As theorized, the first step comprises the reaction:

2. $CaF_2 + 2H_2SO_4 \longrightarrow Ca(HSO_4)_2 + 2HF$ wherein the calcium bisulfate is molten at the temperatures at which the reaction is carried out. It is believed that it is this compound that is responsible for the characteristic and objectionable sticky plastic stage, which in past manufacturing practice has decomposed on the hot furnace walls to form incrustations which interfere with proper heat transfer.

Calcium bisulfate is then believed to react with calcium fluoride to produce calcium sulfate and hydrogen fluoride:

3. $Ca(HSO_4)_2 + CaF_2 \longrightarrow 2\, CaSO_4 + 2HF$

Calcium sulfate is also believed to react with sulfuric acid to form calcium bisulfate according to the reaction:

4. $CaSO_4 + H_2SO_4 \longrightarrow Ca(HSO_4)_2$

It has been found that the calcium sulfate produced by reaction (3) is readily wetted by sulfuric acid and the speed of reaction of the residue with sulfuric acid by reaction (4) is much faster than reaction (3). As a result the reaction mass in a conventional HF furnace passes through the characteristic sticky, plastic stage which in contact with the hot furnace walls, plasters and incrusts.

It has been observed that this troublesome plastic stage persists until about 70–75 percent of the fluoride values have been driven off as HF. The reaction mass is then essentially non-sticking but damp in appearance and can easily be broken and deformed - hence when the reaction is 70–75 percent complete, the calcium sulfate and unreacted calcium fluoride in the mixture, both of which are solids, are able to absorb or control the remaining calcium bisulfate in which the unreacted portion of the sulfuric acid is held in combination. In other words, when the reaction between sulfuric acid and calcium fluoride is approximately 70–75 percent complete, the troublesome plastic stage due to the liquid calcium bisulfate, now reduced to about 40 percent by weight of the reaction mass, has been passed. Since the reaction (4) between sulfuric acid and calcium sulfate to form calcium bisulfate is much faster than either reaction (1) between sulfuric acid and fluorspar, or reaction (3) of calcium bisulfate and fluorspar, the first and most critical reaction composition occurs when the sulfuric acid reacts with a portion of the calcium sulfate to form calcium bisulfate. At this point the presence of a minimum of 3 moles of calcium sulfate for each mole of sulfuric acid and fluorspar is required to absorb the liquid calcium bisulfate.

While the calcium sulfate may be first mixed with the sulfuric acid, it is preferred that the fluorspar and calcium sulfate be mixed after which the sulfuric acid is introduced into this mixture. This may be accomplished in the furnace by introducing the fluorspar at or near the point of the recycle of calcium sulfate, so that as the furnace rotates, the fluorspar and calcium sulfate are mixed. The sulfuric acid may then be introduced into the furnace at a point where it falls upon the mixture and the reaction proceeds as described above. The concentration of sulfuric acid generally employed in the manufacture of hydrofluoric acid is from about 95 to 100 percent, preferably 99 to 100 percent $H_2SO_4$, and the fluorspar contains 97 percent or more calcium fluoride and is of acid grade quality. The amounts of sulfuric acid and fluorspar employed are in approximately stoichiometric proportions, preferably in a small stoichiometric excess. The production of hydrogen fluoride under the conditions of the present process is substantially attained in about 5 minutes up to about 4 or more hours, preferably in about 10 minutes up to 180 minutes, with the reaction proceeding faster at the higher range of temperatures.

The equipment may be any of the conventionally employed externally fired rotary kilns provided with means for recirculating by-product calcium sulfate to the feed end of the furnace. The recirculating means may be external, but preferably recirculation is achieved by internal means, thereby conserving the heat of the system. Since corrosion is substantially eliminated in the use of the process of the present invention, there is no need to use special alloys in the materials used in the furnace interior wall construction.

The following specific examples illustrate the present invention, but are not considered to be limiting the scope of the invention.

EXAMPLE 1

2700 lbs. per hour of 99.5 percent sulfuric acid and 2300 lbs. per hour of acid grade fluorspar are continuously-fed into an externally fired rotary furnace, 5.5 feet in diameter and 17 feet long, externally heated to maintain an internal temperature of about 450°F., and rotated at 5 RPM. No calcium sulfate is present at the feed end of the reactor where the fluorspar and sulfuric acid are introduced. The hydrogen fluoride gas evolved as a result of the reaction is released at the rate of 1000 pounds per hour. Calcium sulfate is removed from the furnace at a rate of about 4000 lbs. per hour. Commercial hydrogen fluoride is produced, having the following analysis:

| | |
|---|---|
| HF | 99.2% |
| $SO_2$ | 0.5% |
| Elemental S | Present |

Steel rails are provided in the furnace interior and typically after less than 1400 hours of operation the removal of the furnace from production service will be required for replacement of rails and extensive repairs to the shell.

EXAMPLE 2

In the same type equipment, 10 feet in diameter and 60 feet long, means are provided for recirculating by-product calcium sulfate to the feed end of the furnace at a rate of about 4 parts of recycle per part of by-product calcium sulfate produced. No rails are provided in the furnace. To the recycled calcium sulfate is added 13,300 lbs. per hour of sulfuric acid and 11,000 lbs. per hour of acid grade fluorspar. The rotary furnace is maintained at about 2 RPM and the recirculation of by-product calcium sulfate maintained at approximately 72,000 pounds per hour.

The temperature in the furnace is maintained at about 350°–450°F. The average retention time of the reaction mass within the furnace is about 2 hours, wherein 5000 lbs. per hour of hydrogen fluoride is produced having the following analysis:

| | |
|---|---|
| HF | 99.5% |
| $SO_2$ | 0.2% |
| Elemental S | Absent |

This furnace, after 8 months of operation, is still on stream. There has been very little corrosive action and no serious incrustation problems. No more than minimal repairs are indicated.

While the above describes the preferred embodiments of our invention for purposes of illustration, it will be understood that various changes and modifications can be made therein without departing from the spirit and scope of the invention.

We claim:

1. A method for preventing encrustation on the interior walls of an externally fired rotary furnace, said furnace containing no mechanical elements such as rails or scrapers, during the production of hydrogen fluoride which consists essentially in forming in the reaction zone at the reaction temperature maintained therein, a free-flowing, solid mixture of calcium fluoride, sulfuric acid and from 3.5 parts up to about 10 parts of calcium sulfate per part of by-product calcium sulfate produced, reacting said mixture at temperatures within the range of about 250° to 600°F. to produce hydrogen fluoride and by-product calcium sulfate and removing said hydrogen fluoride and by-product calcium sulfate from said reaction zone.

2. The process of claim 1, wherein the calcium sulfate mixed with the reactants is recycled by-product calcium sulfate.

3. the process of claim 1, wherein the ratio of calcium sulfate mixed with the reactants is 4 to 8:1.

4. The process of claim 2, wherein said calcium sulfate is withdrawn from a point in the reaction between the calcium fluoride and sulfuric acid, where more than 70 percent completion has been attained.

* * * * *